United States Patent
Chang et al.

(10) Patent No.: US 10,473,808 B2
(45) Date of Patent: Nov. 12, 2019

(54) ACOUSTIC LOGGING TOOL UTILIZING FUNDAMENTAL RESONANCE

(71) Applicant: Halliburton Energy Services, Inc., Houston, TX (US)

(72) Inventors: Chung Chang, Houston, TX (US); Chen Li, Katy, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 209 days.

(21) Appl. No.: 15/508,874

(22) PCT Filed: Nov. 17, 2015

(86) PCT No.: PCT/US2015/061110
§ 371 (c)(1),
(2) Date: Mar. 3, 2017

(87) PCT Pub. No.: WO2017/086938
PCT Pub. Date: May 26, 2017

(65) Prior Publication Data
US 2017/0276819 A1 Sep. 28, 2017

(51) Int. Cl.
*G01V 1/40* (2006.01)
*B06B 1/06* (2006.01)
*E21B 47/10* (2012.01)
*G01V 1/52* (2006.01)

(52) U.S. Cl.
CPC .............. *G01V 1/40* (2013.01); *B06B 1/0603* (2013.01); *B06B 1/0622* (2013.01); *E21B 47/101* (2013.01); *G01V 1/52* (2013.01); *G01V 2001/526* (2013.01)

(58) Field of Classification Search
CPC ...... G01V 1/40; G01V 1/52; G01V 2001/526; B06B 1/0603; B06B 1/0622; E21B 47/101
See application file for complete search history.

(56) References Cited

U.S. PATENT DOCUMENTS

| | | | |
|---|---|---|---|
| 3,341,721 A * | 9/1967 | Vincent ................ | G10K 11/004 310/331 |
| 4,682,308 A | 7/1987 | Chung | |
| 4,782,910 A * | 11/1988 | Sims .................... | B06B 1/0603 181/106 |
| 4,899,844 A * | 2/1990 | Katahara ................ | G01V 1/005 181/106 |
| 5,042,611 A | 8/1991 | Howlett | |

(Continued)

FOREIGN PATENT DOCUMENTS

WO 9621871 7/1996

OTHER PUBLICATIONS

International Search Report and Written Opinion of PCT Application No. PCT/US2015/061110 dated Aug. 17, 2016: pp. 1-17.

*Primary Examiner* — Krystine E Breier
(74) *Attorney, Agent, or Firm* — Chamberlain Hrdlicka

(57) ABSTRACT

An acoustic logging tool includes a first acoustic transducer and a second acoustic transducer. At least a portion of the first transducer is parallel with the second transducer. The first and second acoustic transducers are configured to propagate an acoustic signal in the same direction. The first acoustic transducer is configured to generate an acoustic output having a different frequency than the second acoustic transducer.

23 Claims, 6 Drawing Sheets

(56) References Cited

U.S. PATENT DOCUMENTS

| | | | | |
|---|---|---|---|---|
| 5,099,461 | A * | 3/1992 | Fitzgerald | B06B 1/0603 |
| | | | | 310/330 |
| 5,677,894 | A | 10/1997 | Erath | |
| 5,815,466 | A | 9/1998 | Erath | |
| 7,149,318 | B2 * | 12/2006 | Bank | H04R 7/00 |
| | | | | 381/190 |
| 7,414,918 | B2 * | 8/2008 | Hurst | G01V 1/46 |
| | | | | 181/105 |
| 7,460,435 | B2 * | 12/2008 | Garcia-Osuna | G01V 1/52 |
| | | | | 367/25 |
| 8,547,790 | B2 * | 10/2013 | Vu | G01V 1/46 |
| | | | | 367/32 |
| 8,854,923 | B1 * | 10/2014 | Eyster | H04R 17/00 |
| | | | | 310/317 |
| 9,453,926 | B2 * | 9/2016 | Vu | G01V 1/46 |
| 9,541,657 | B2 * | 1/2017 | Mandal | H01L 41/0933 |
| 9,842,581 | B2 * | 12/2017 | Mayor | G01V 1/159 |
| 2003/0059069 | A1 * | 3/2003 | Bank | H04R 7/045 |
| | | | | 381/152 |
| 2010/0202252 | A1 | 8/2010 | Ounadjela et al. | |
| 2016/0072040 | A1 * | 3/2016 | Fripp | B06B 1/0215 |
| | | | | 73/152.47 |
| 2016/0114354 | A1 * | 4/2016 | Chang | E21B 47/101 |
| | | | | 367/31 |
| 2016/0273351 | A1 | 9/2016 | Fripp et al. | |

\* cited by examiner

ACOUSTIC LOGGING TOOL UTILIZING FUNDAMENTAL RESONANCE

BACKGROUND

This section is intended to introduce the reader to various aspects of art that may be related to various aspects of the presently described embodiments. This discussion is believed to be helpful in providing the reader with background information to facilitate a better understanding of the various aspects of the described embodiments. Accordingly, it should be understood that these statements are to be read in this light and not as admissions of prior art.

Acoustic logging operations are used to collect data regarding the rock formation around a wellbore. Typically, an acoustic logging tool in the form or a wireline tool or logging while drilling tool is positioned within the wellbore to collect such data. The acoustic logging tool emits one or more acoustic signals in multiple directions at the surrounding wellbore wall or formation. The acoustic signal travels through the formation and returns to the logging tool having been altered by the formation. As different characteristics of the formation alter the signal differently, the returning signal carries data regarding characteristics or properties of the formation. Thus, by analyzing the returning signal, such formation characteristics and properties can be obtained.

Acoustic logging tools generally utilize an acoustic source such as a piezoelectric acoustic transducer, which produces an acoustic wave. Depending on the parameters of the logging operation, it may be desired for the acoustic wave to have a strong output at certain frequencies or range of frequencies.

BRIEF DESCRIPTION OF THE DRAWINGS

For a detailed description of the embodiments of the invention, reference will now be made to the accompanying drawings in which.

DETAILED DESCRIPTION

Figure 1:
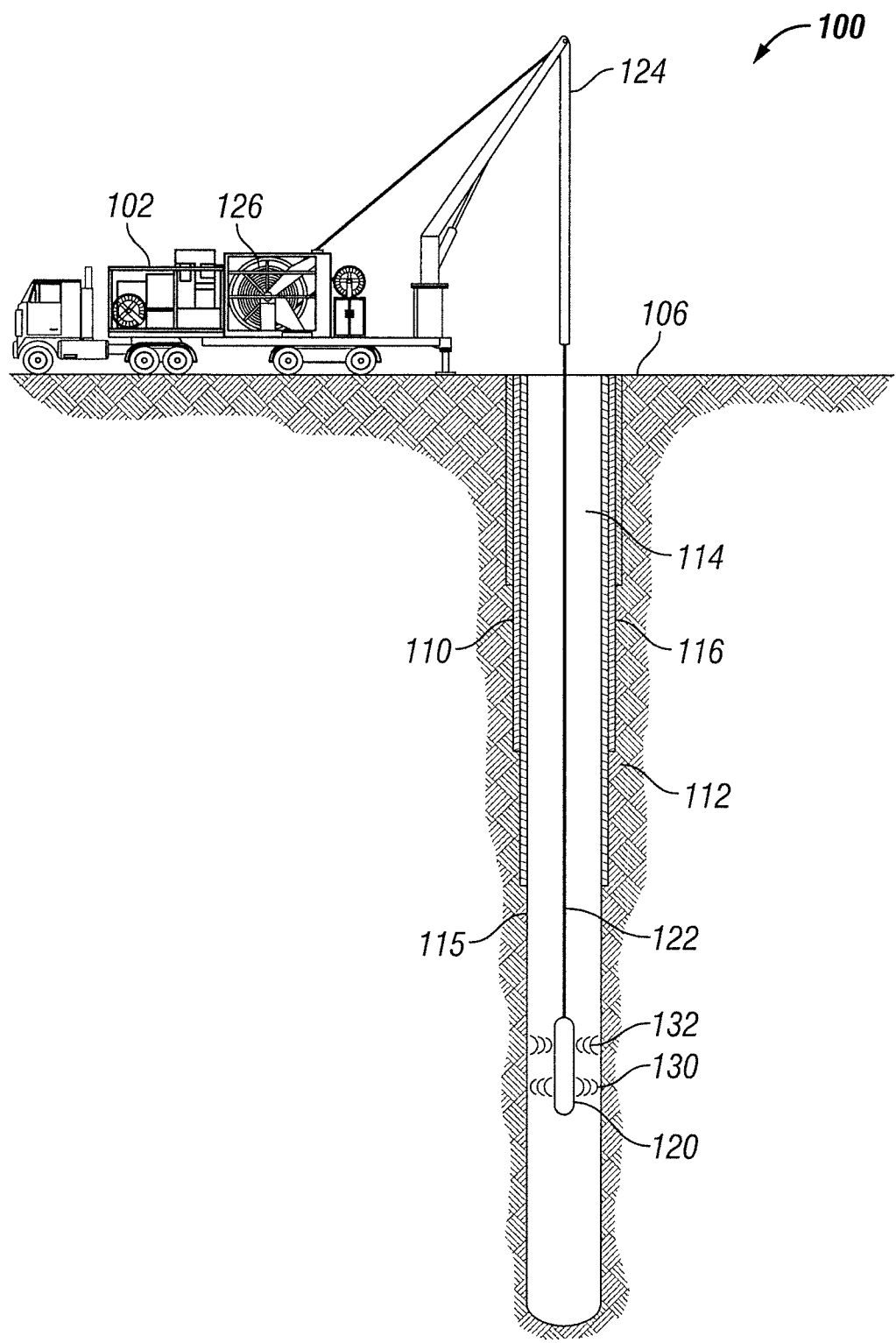
FIG. 1 is a schematic view of an acoustic logging operation, in accordance with example embodiments of the present disclosure.

Referring to the drawings, FIG. 1 is a simplified illustration of an acoustic logging operation 100, in accordance with example embodiments, conducted to obtain certain characteristics of a well 114. The well 114 is formed from a surface well site 106 through one or more formations 112. In some embodiments, the well 114 may include a wellbore 115 which is at least partially defined by a casing string 110. Lower parts of the wellbore 115 may be left uncased and described as "open hole." In certain example embodiments, production fluids may enter the well 114 from the surrounding formations 112.

In some embodiments, the acoustic logging operating 100 may be a wireline operation, in which an acoustic logging tool 120 is lowered into the well 114 via a wireline 122. In some embodiments, the wireline 122 is suspended from a wireline truck 102 parked at the well site 106. The wireline truck 102 may include a wireline spool 126 which supplies the wireline. The wireline truck 102 may also include a hoist 124 which suspends the wireline 122 and acoustic logging tool 120 in the well 114. In some embodiments, the wireline 122 may be suspended by various other well site structures such as a rig.

In some embodiments, the acoustic logging tool 120 is configured to emit acoustic signals 130 to the wellbore wall 115 and through the formation 112. The acoustic logging tool 120 then detects the returning acoustic data signal 132. The returning acoustic data signal 132 is altered from the original acoustic signal 130 based on the mechanical properties of the formation, such as compressional velocity, shear velocity, and the like. Thus, the acoustic data signal 132 carries such information and can be processed to obtain the formation properties.

Figure 2:
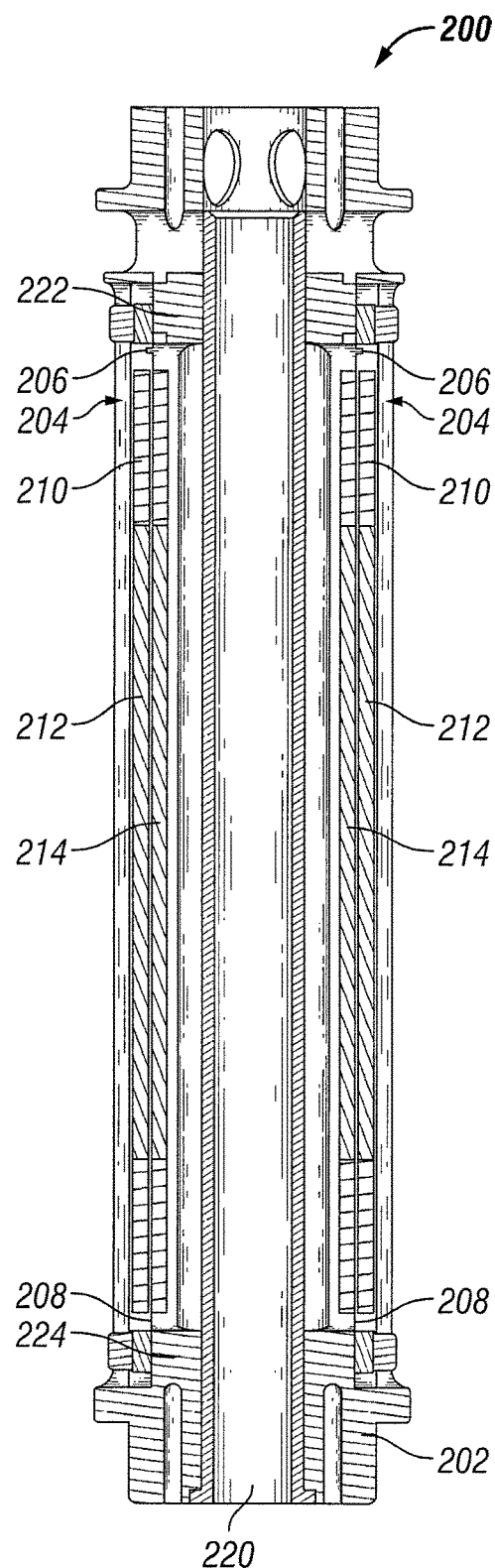
FIG. 2 is a lateral cross-sectional view of an internal structure of an acoustic logging device, in accordance with example embodiments of the present disclosure.

FIG. 2 illustrates an internal structure 200 of the acoustic logging tool 120, in accordance with example embodiments. The internal structure 200 includes a support structure 202 comprising an upper portion 222 and a lower portion 224. The support structure 202 is generally disposed within a housing (not shown). The acoustic logging tool 120 further includes one or more acoustic transducer assemblies 204. FIG. 2 illustrates a co-planar embodiment of the acoustic transducer assembly 204, which is illustrated and described in more detail below with respect to FIGS. 4A and 4B. Each of the one or more acoustic transducer assemblies 204 is configured to generate one or more acoustic signals upon receiving an applied excitation voltage. In some embodiments the acoustic transducer assemblies 204 generate acoustic signals that propagate in different directions from each other. At least one of the acoustic transducer assemblies 204 is configured to generate acoustic signals at two different frequencies.

In some embodiments, when the acoustic logging tool is a logging while drilling tool, the acoustic logging tool 120 may include a flow bore 220 through which drilling fluid can flow. In other embodiments, the logging tool 120 may not include the flowbore 220. In some embodiments, each of the acoustic transducer assemblies 204 includes a first end 206 and a second end 208. The first ends 206 are coupled to the upper portion 222 of the support structure 202 and the second ends 208 are coupled to the lower portion 224 of the support structure 202. Each acoustic transducer assembly 204 includes at least one substrate 210 that extends between the first end 206 and second end 208. Each acoustic transducer assembly 204 also includes at least one first piezoelectric element 212 coupled to one side of the substrate 210 and at least one second piezoelectric element 214 coupled to an opposite side of the substrate 210.

Figure 3:
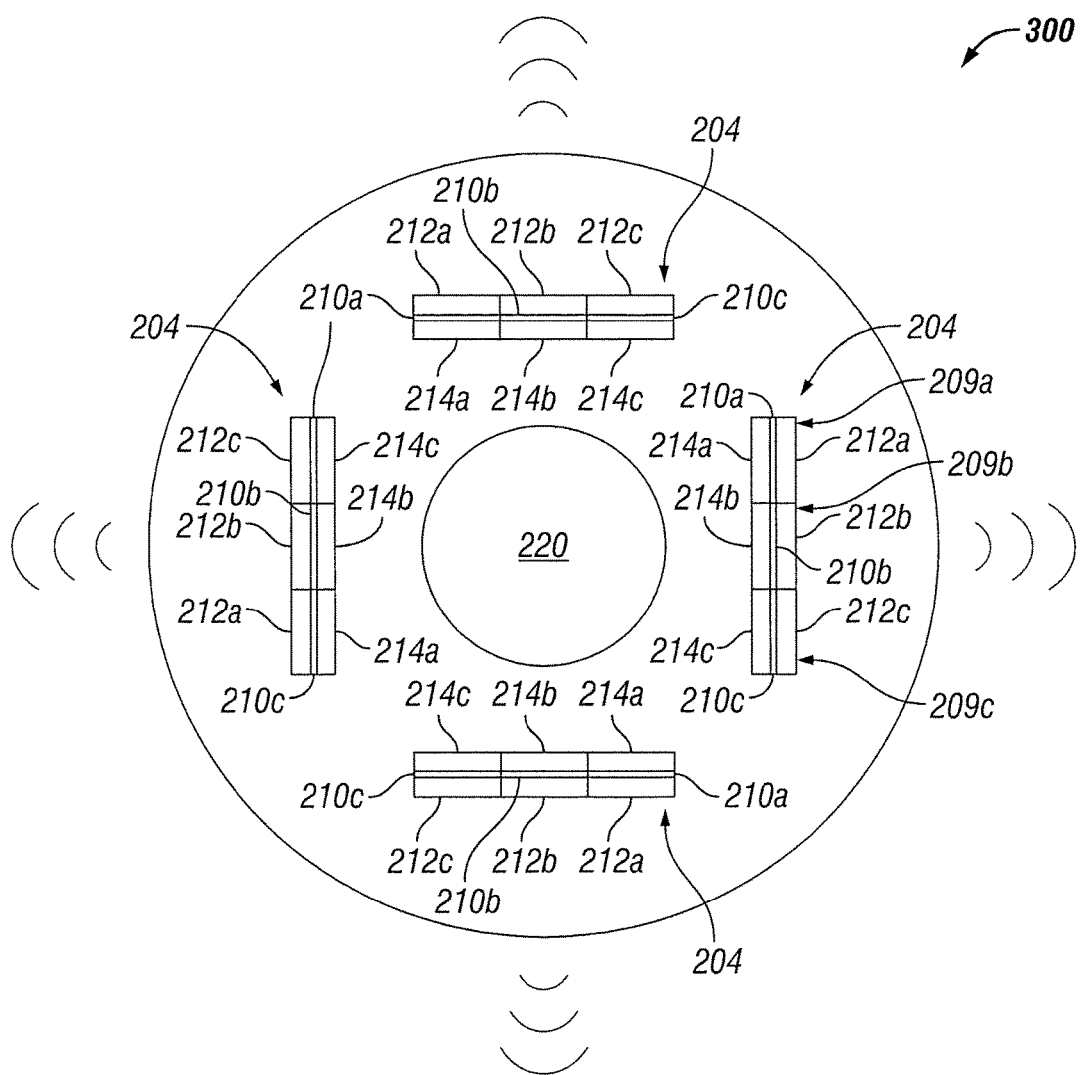
FIG. 3 is an axial cross-sectional view of an acoustic logging device, in accordance with example embodiments of the present disclosure.

FIG. 3 illustrates an axial cross-sectional view of an acoustic logging tool 300, in accordance with example embodiments of the present disclosure. In the illustrated embodiment, the logging tool 300 includes four sets of acoustic transducers 204 configured to generate acoustic signals propagating in four different directions.

Figure 4A:
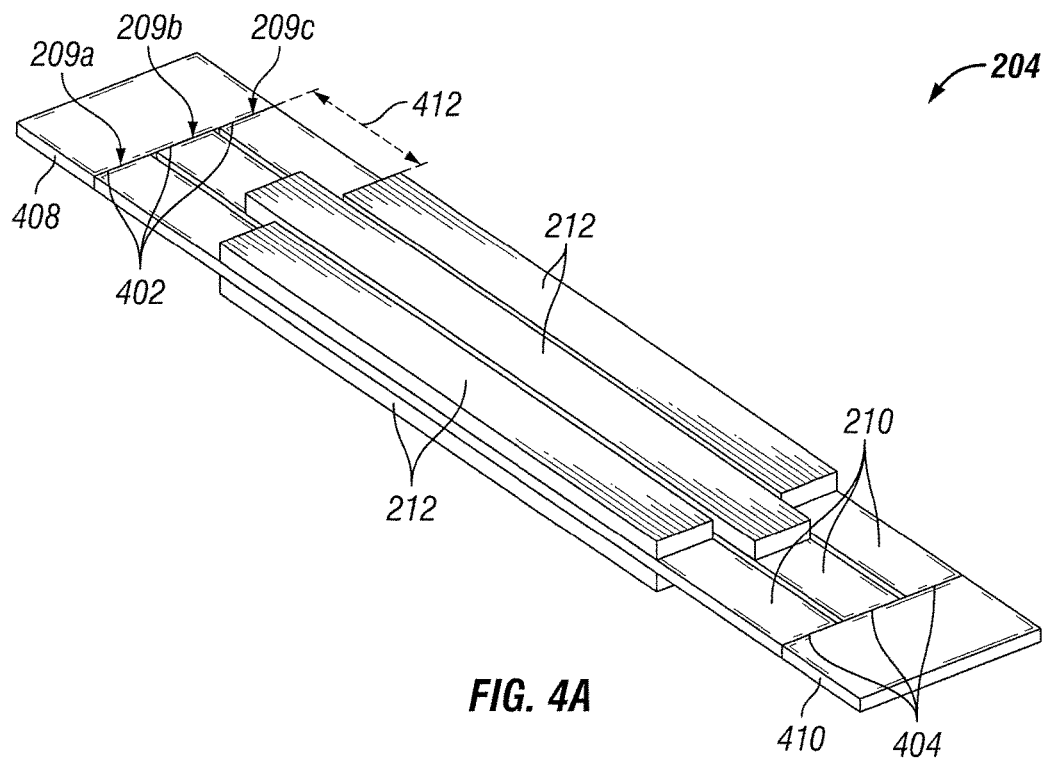
FIG. 4A is a perspective view of a co-planar an acoustic transducer assembly in a first vibrational position, in accordance with example embodiments of the present disclosure.
Figure 4B:
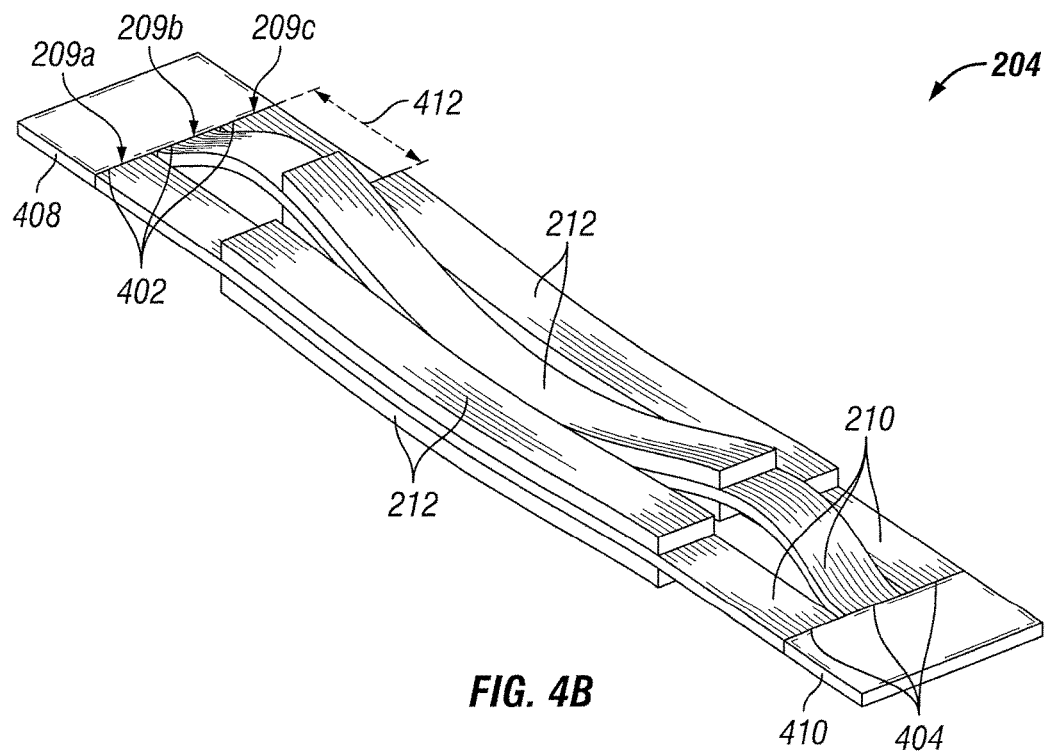
FIG. 4B is a perspective view of the co-planar acoustic transducer assembly in a second vibrational position, in accordance with example embodiments of the present disclosure.

FIGS. 4A and 4B illustrate a perspective view of a co-planar implementation of the acoustic transducer assembly 204, in accordance with an example embodiment of the present disclosure. FIG. 4A illustrates the acoustic transducer assembly 204 in a neutral position and FIG. 4B illustrates the acoustic transducer assembly 204 in a vibrational position. Referring to FIGS. 2, 3, 4A, and 4B, the acoustic transducer assembly 204 includes at least a first acoustic transducer 209a and a second acoustic transducer 209b. In some embodiments, the first and second acoustic transducers 209a, 209b have different natural frequencies. In some embodiments, the acoustic transducer assembly 204 includes a third acoustic transducer 209c. In some embodiments, each of the acoustic transducers 209 includes a substrate 210. In some embodiments, the substrate 210 is generally formed in a flat elongated shape having a first end 402 and a second end 404. Each of the acoustic transducers 209 further includes a two piezoelectric elements 212, 214 coupled to opposite sides of the substrate 210. In some embodiments, the piezoelectric elements 212 are rectangular strips having a certain length, width, and thickness as designated by design preferences and application. In some embodiments, the acoustic transducers are coupled to the support structure 202 at the first and second ends 402, 404.

In some embodiments, the acoustic transducer assembly 204 includes a first end-piece 408 to which the first ends 402 of the substrates 210 are coupled. In such embodiments, the acoustic transducer assembly 204 also includes a second end-piece 410 to which the second ends 404 of the substrates 210 are coupled. In some embodiments, the end-pieces 408, 410 and the substrates 210 are formed from a single continuous piece of material in which slits are formed to enable each substrate 210 to flex independently. The first ends 402 and second ends 404 of the substrates 210 are fixed in place by the end-pieces 408, 410. In some embodiments, the end-pieces 408, 410 couple the acoustic transducer assembly 204 to the support structure 202. In other embodiments, the acoustic transducer assembly 204 does not include end-pieces 408, 410 and each acoustic transducer 209 is fixed to the support structure 202 individually via the first and second ends 402, 404 of its substrate 210. The substrate 210 may be fabricated from brass or various appropriate materials, such as steel, titanium, copper, among others.

In some embodiments, the first and second ends 402, 404 of the substrate 210 extend beyond the piezoelectric elements 212 in one or more dimensions. A length by which the substrate 210 extends beyond the piezoelectric elements 212, 214 is the flange length 412 of the acoustic transducer 209. In some embodiments, the flange length 412 of the first acoustic transducer 209a is different (e.g., longer, shorter) than the flange length 412 of the second acoustic transducer 209b.

For example, referring to FIGS. 4A and 4B, the substrate 210 of the first acoustic transducer 209a is the same size as the substrate 210 of the second acoustic transducer 209b, and the piezoelectric elements 212 of the first acoustic transducer 209a are shorter than the piezoelectric elements 212 of the second acoustic transducer 209b. Thus, the flange length 412 of the second acoustic transducer 209b is smaller than the flange length 412 of the first acoustic transducer 209a. In certain such cases, the second acoustic transducer 209b generates an acoustic wave with a lower frequency than the first acoustic transducer 209a. In some embodiments, the substrates 210 extend beyond the piezoelectric elements 212 in more than one direction, forming a flange area. In some embodiments, the first acoustic transducer 209a has a flange area of a different size than the second acoustic transducer 209a.

In some embodiments, the third acoustic transducer 209c is substantially identical to the first acoustic transducer 209a and generates an acoustic wave of the same frequency when the same excitation voltage is applied. Thus, the acoustic output of the acoustic transducer assembly 204 at that frequency is the sum of the acoustic outputs of the first acoustic transducer 209a and the third acoustic transducer 209c. Each acoustic transducer 209 in the acoustic transducer assembly 204 are substantially parallel with each other and generates acoustic waves which propagate in the same direction. In some embodiments, the acoustic transducers 209 are disposed laterally next to each other as illustrated in FIGS. 4A and 4B. In some embodiments, the acoustic transducers 209 are adjacently aligned but vibrate independently. The acoustic transducers 209 may be spaced apart. The first acoustic transducer 209 may be set deeper into the support structure 200 or tool 120 than the second acoustic transducer 209. In some embodiments in which the third acoustic transducer 209c is substantially identical to the first acoustic transducer 209a, the second acoustic transducer 209b is disposed in between the first acoustic transducer 209a and the third acoustic transducer 209c.

In some embodiments, the piezoelectric elements 212 of each acoustic transducer share an electrical ground where coupled to the substrate 210. When the same AC voltage is applied to the piezoelectric elements 212 of an acoustic transducer 209, one piezoelectric element 212 contracts while the other piezoelectric element 214, located on the opposite side of the substrate 210 from the first piezoelectric element 212, expands. The two piezoelectric elements 212 alternatingly expand and contract due to piezoelectric stresses induced by the applied voltage. This causes the substrate 210 to flex back and forth, causing vibration or back and forth arcing of the acoustic transducer 209, which generates an acoustic pressure wave.

In some embodiments, the first acoustic transducer 209a is excited in a first mode and the second acoustic transducer 209b is excited in a third mode, or vice versa. The first mode and the third mode occur at different frequencies. In some embodiments, the first acoustic transducer 209a is designed to exhibit a strong pressure output at the first mode frequency and the second acoustic transducer 209b is designed to exhibit a strong pressure output at the third mode frequency. Thus, the combined acoustic output of the first and second acoustic transducers 209a, 209b exhibits a strong pressure output spanning such a frequency range and especially at the first and third mode frequencies. In some embodiments which comprise a third acoustic transducer 209c, the third acoustic transducer 209c can be excited to generate an acoustic output having a first mode frequency, a third mode frequency, or another frequency. In some such embodiments, the third acoustic transducer 209c is designed to generate an acoustic output substantially identical to the first or second acoustic transducer 209a, 209b, further enhancing the acoustic output at that frequency.

The sizes and configuration of each acoustic transducer 209 in the acoustic transducer assembly can be similar or different, with specific dimension sizes chosen based on operational goals and limitations. For example, the length, width, and thickness of the substrate 210 as well as the length, width, and thickness of the piezoelectric elements 212 can be individual selected depending on the implementation. The acoustic transducers may be co-located in an axial direction.

Figure 5A:
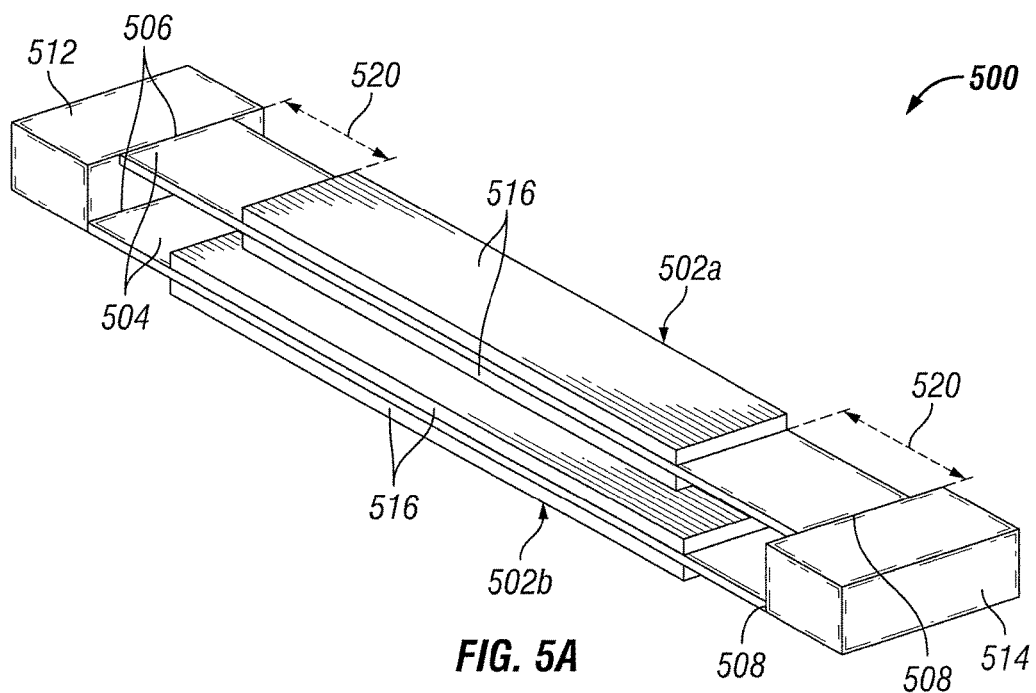
FIG. 5A is a perspective view of a stacked acoustic transducer assembly in a first vibrational position, in accordance with example embodiments of the present disclosure.
Figure 5B:
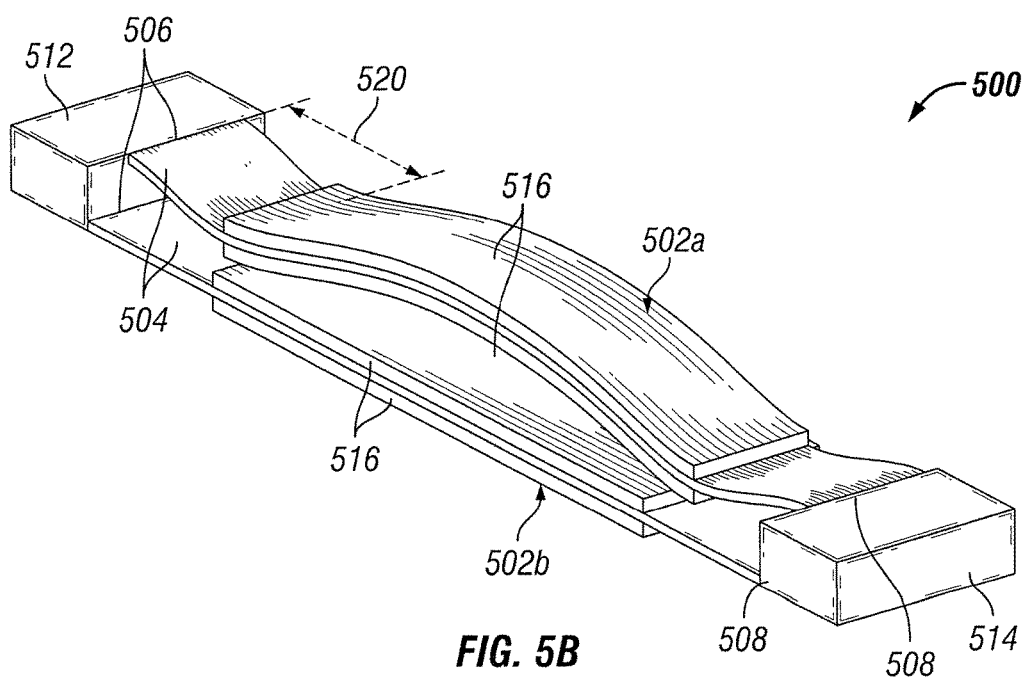
FIG. 5B is a perspective view of the stacked acoustic transducer assembly in a second vibrational position, in accordance with example embodiments of the present disclosure.

FIGS. 5A and 5B illustrate a stacked implementation of an acoustic transducer assembly 500, in accordance with example embodiments of the present disclosure. FIG. 5A illustrates the acoustic transducer assembly 500 in a neutral position and FIG. 5B illustrates the acoustic transducer assembly 500 in a vibrational position. Referring to FIGS. 5A and 5B, the acoustic transducer assembly 500 includes at least a first acoustic transducer 502a and a second acoustic transducer 502b. In some embodiments, the acoustic transducer assembly 500 includes more than two acoustic transducers 502. All the acoustic transducers 502 in the acoustic transducer assembly 500 generate acoustic waves which propagate in the same direction. In some embodiments and as illustrated in FIGS. 5A and 5B, the first acoustic transducer 502a is disposed in front of, above, or overlaps the second acoustic transducer 502b in the direction of propagation of the acoustic waves. Thus, the acoustic wave generated by the first acoustic transducer 502a overlaps the acoustic wave generated by the second acoustic transducer 502b.

Similar to the acoustic transducers 209 of FIGS. 4A and 4B described above, the acoustic transducers 502 each include a substrate 504 with a pair of piezoelectric elements 516 disposed thereon. The substrate 504 has a generally flat, elongated shape having a first end 506 and a second end 508. The piezoelectric elements 516 are coupled to opposite sides of the substrate 504. In some embodiments, the acoustic transducers 502 are coupled to the support structure 202 (FIG. 2) at the first and second ends 506, 508. In some embodiments, the acoustic transducer assembly 500 includes a first end-piece 512 to which the first ends 506 of the substrates 504 are coupled. In such embodiments, the acoustic transducer assembly 500 also includes a second end-piece 514 to which the second ends 508 of the substrates 504 are coupled. In some embodiments, the first ends 506 and second ends 508 of the substrates 504 are fixed in place by the end-pieces 512, 514, respectively. In some embodiments, the end-pieces 512, 514 couple the acoustic transducer assembly 500 to the support structure 202. In other embodiments, each acoustic transducer 502 is fixed to the support structure 202 individually via the first and second ends 506, 508 of its substrate 504. In some embodiments, the substrate 504 is fabricated from brass. In other embodiments, the substrate 504 can be fabricated from various appropriate materials, such as steel, titanium, copper, among others.

Each of the acoustic transducers 502 further includes first piezoelectric elements 516 coupled to opposite sides of the substrate 504. In some embodiments, the first and second ends 506, 508 of the substrate 504 extend beyond the piezoelectric elements 516. The length by which the substrate 504 extends beyond the piezoelectric elements 516 is the flange length 520 of the acoustic transducer 502. In some embodiments, the flange length 520 of the first acoustic transducer 502a is longer or shorter than the flange length 520 of the second acoustic transducer 502b. Thus, the acoustic transducers 502 generate acoustic waves of different frequencies. In some embodiments, the substrates 504 of the acoustic transducers 502 have different widths, thicknesses, and/or lengths. In some embodiments, the substrates 504 extend beyond the piezoelectric elements 516, in more than one direction, forming a flange area. In some embodiments, the first acoustic transducer 502a has a flange area of a different size than the second acoustic transducer 502a.

The orientation of the acoustic transducers in the acoustic transducer assembly 500 can be described as stacked, in which a piezoelectric element 516 of the second acoustic transducer 502b faces a piezoelectric element (not shown) of the first acoustic transducer 502a. There is enough clearance between the first acoustic transducer 502a and the second acoustic transducer 502b such that each acoustic transducer 502 can vibrate independently at the same time without touching the other. The acoustic transducers 502 may also be co-located in an axial direction.

In some embodiments, the first acoustic transducer 502a is excited in a first mode and the second acoustic transducer 502b is excited in a third mode, or vice versa. The first mode and the third mode occur at different frequencies. In some embodiments, the first acoustic transducer 502a is designed to exhibit a strong pressure output at the first mode frequency and the second acoustic transducer 502b is designed to exhibit a strong pressure output at the third mode frequency. Thus, the combined acoustic output of the first and second acoustic transducers 502a, 502b exhibits a strong pressure output spanning such a frequency range and especially at the first and third mode frequencies. Thus, the sum of the first acoustic wave and the second acoustic wave is propagated into a target formation region.

The sizes and configuration of each acoustic transducer 502 in the acoustic transducer assembly can be similar or different, with specific dimension sizes chosen based on operational goals and limitations. For example, the length, width, and thickness of the substrate 504 as well as the length, width, and thickness of the piezoelectric elements 516 can be individual selected depending on the implementation.

Figure 6:
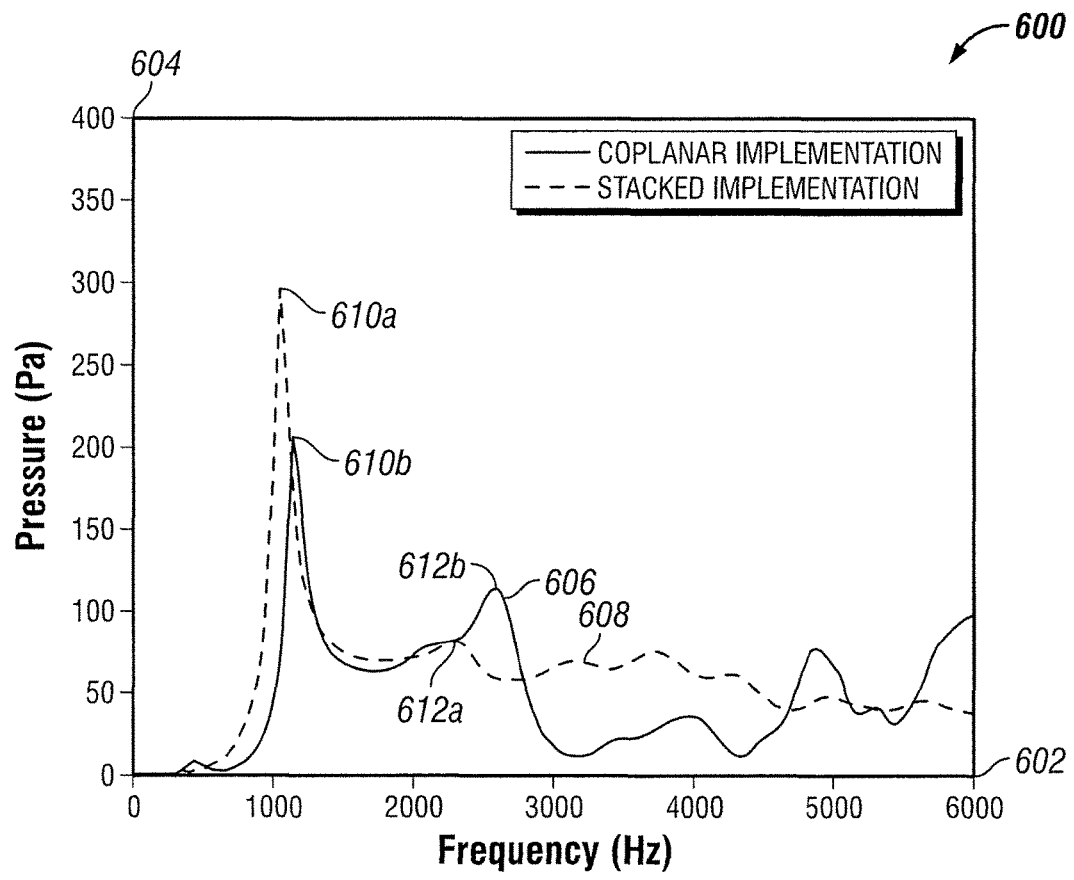
FIG. 6 is a graph of the acoustic output of the acoustic transducer assembly with respect to frequency, in accordance with example embodiments of the present disclosure.

FIG. 6 is a graph 600 of the acoustic output of the acoustic transducer assembly with respect to frequency in accordance with example embodiments of the present disclosure. The graph includes frequency 602 as the explanatory variable or x-axis, and acoustic pressure as the response variable or y-axis. The frequency 602 refers to the frequency of the acoustic output generated by the acoustic transducer assembly and the acoustic pressure 604 is indicative of the strength or intensity of the acoustic output. The graph illustrates the frequency-pressure relationship for the acoustic output generated by the co-planar implementation 606 of the acoustic transducer assembly 204 illustrated in FIGS. 4A-4B as well as the frequency-pressure relationship of the acoustic output of the stacked implementation 608 of the acoustic transducer assembly 500 illustrated in FIGS. 5A-5B. In many applications, a pressure 604 of 50 Pa or above is considered substantial and useful. Of particular importance is the pressure 604 of the acoustic output at the 1st mode 610 frequencies and the 3rd mode 612 frequencies as the pressure 604 response tends to peak at these modes.

In some embodiments, the acoustic transducer assembly, including the example embodiments illustrated in FIGS. 4A-5B, exhibit substantial acoustic output at mode 1 frequencies as well as mode 3 frequencies. In some embodiments, the acoustic transducer assemblies generate acoustic outputs having strong pressure 604 outputs between the 400 Hz and 3000 Hz frequency range. For example, in an application involving a slow formation and large borehole radius, the acoustic transducer assemblies are configured to produce broad frequency outputs, especially in the lower frequency range. Additionally, the acoustic transducer assemblies may also configured to keep the frequency output relatively constant without significant peaks and notches.

In addition to the embodiments described above, many examples of specific combinations are within the scope of the disclosure, some of which are detailed below:

EXAMPLE 1

An acoustic logging tool, comprising:
a first acoustic transducer and a second acoustic transducer,
wherein at least a portion of the first transducer is parallel with the second transducer;
wherein the first and second acoustic transducers are configured to propagate an acoustic signal in the same direction; and
wherein the first acoustic transducer is configured to generate an acoustic output having a different frequency than the second acoustic transducer.

EXAMPLE 2

The acoustic logging tool of example 1, wherein each of the first and second acoustic transducers comprises:
a substrate having a first side and a second side;
a first piezoelectric element coupled to the first side; and
a second piezoelectric element coupled to the second side.

EXAMPLE 3

The acoustic logging tool of example 1, wherein the first acoustic transducer is located laterally next to the second acoustic transducer or located so as to overlap with the second acoustic transducer in the direction of propagation.

EXAMPLE 4

The acoustic logging tool of example 1, wherein the first acoustic transducer and the second acoustic transducer are configured to exhibit different $1^{st}$ mode and $3^{rd}$ mode frequencies.

EXAMPLE 5

The acoustic logging tool of example 1, wherein the first acoustic transducer comprises a shorter flange length and is configured to exhibit a lower $1^{st}$ mode frequency than the second acoustic transducer.

EXAMPLE 6

The acoustic logging tool of example 1, wherein the acoustic transducer assembly comprises a third acoustic transducer identical to the first acoustic transducer and wherein the first and third acoustic transducers are located on opposite sides of the second acoustic transducer.

EXAMPLE 7

The acoustic logging tool of example 1, further comprising a plurality of sets of first and second acoustic transducers, each set configured to propagate an acoustic signal in a different direction.

EXAMPLE 8

The acoustic logging tool of example 2, wherein:
the substrate of the first acoustic transducer extends beyond the first and second piezoelectric components of the first acoustic transducers by a first flange area;
the substrate of the second acoustic transducer extends beyond the first and second piezoelectric components of the second acoustic transducers by a second flange area; and
the first flange area is a different size than the second flange area.

EXAMPLE 9

A method of performing acoustic logging, comprising:
emitting a first acoustic wave from a first acoustic transducer, the first acoustic wave propagating in a first direction at a first frequency; and
emitting a second acoustic wave from a second acoustic transducer, the first acoustic wave propagating in the first direction at a second frequency different from the first frequency.

EXAMPLE 10

The method of example 9, further comprising:
propagating the sum of the first acoustic wave and the second acoustic wave into a target formation region.

EXAMPLE 11

The method of example 9, wherein the first acoustic transducer is disposed laterally next to the second acoustic transducer or overlaps the second acoustic transducer in the direction of propagation.

EXAMPLE 12

The method of example 9, wherein the first acoustic transducer and the second acoustic transducer are co-located in an axial direction.

EXAMPLE 13

The method of example 9, further comprising:
emitting the first acoustic wave at a $1^{st}$ mode frequency; and
emitting the second acoustic wave at a $3^{rd}$ mode frequency.

EXAMPLE 14

The method of example 9, further comprising:
emitting a third acoustic wave from a third acoustic transducer, the third wave propagating in the first direction.

EXAMPLE 15

The method of example 9, further comprising:
measuring a pressure generated by the first and second transducers at a specific distance.

EXAMPLE 16

The method of example 9, further comprising:
generating a dipole acoustic signal from the first acoustic wave, the second acoustic wave, or both.

EXAMPLE 17

An acoustic transducer assembly, comprising:
a first acoustic transducer and a second acoustic transducer, each of the first and second acoustic transducers comprising:
  a substrate comprising a first end, a second end, a first side, and a second side;
  a first piezoelectric element coupled to the first side; and
  a second piezoelectric element coupled to the second side;
wherein the first ends of the first and second acoustic transducers are fixed together and the second ends of the first and second acoustic transducers are fixed together;
wherein the first and second acoustic transducers are configured to generate acoustic signals that propagate in the same direction; and
wherein the first acoustic transducer is configured to generate an acoustic output having a different frequency than the second acoustic transducer.

EXAMPLE 18

The acoustic logging tool of example 17, wherein the first acoustic transducer is located laterally next to the second acoustic transducer or located so as to overlap with the second acoustic transducer in the direction of propagation.

EXAMPLE 19

The acoustic logging tool of example 17, wherein the first acoustic transducer and the second acoustic transducer are co-located in an axial direction.

EXAMPLE 20

The acoustic logging tool of example 17, wherein the first acoustic transducer and the second acoustic transducer are configured to exhibit different $1^{st}$ mode and $3^{rd}$ mode frequencies.

EXAMPLE 21

The acoustic logging tool of example 17, the first and second acoustic transducers are free to vibrate independently from each other.

EXAMPLE 22

The acoustic logging tool of example 17, wherein:
the substrate of the first acoustic transducer extends beyond the first and second piezoelectric components of the first acoustic transducer by a first flange area;
the substrate of the second acoustic transducer extends beyond the first and second piezoelectric components of the second acoustic transducer by a second flange area; and
the first flange area is a different size than the second flange area.

EXAMPLE 23

The acoustic logging tool of example 17, wherein the first acoustic transducer and the second acoustic transducer have different natural frequencies.

This discussion is directed to various embodiments of the invention. The drawing figures are not necessarily to scale. Certain features of the embodiments may be shown exaggerated in scale or in somewhat schematic form and some details of conventional elements may not be shown in the interest of clarity and conciseness. Although one or more of these embodiments may be preferred, the embodiments disclosed should not be interpreted, or otherwise used, as limiting the scope of the disclosure, including the claims. It is to be fully recognized that the different teachings of the embodiments discussed may be employed separately or in any suitable combination to produce desired results. In addition, one skilled in the art will understand that the description has broad application, and the discussion of any embodiment is meant only to be exemplary of that embodiment, and not intended to intimate that the scope of the disclosure, including the claims, is limited to that embodiment.

Certain terms are used throughout the description and claims to refer to particular features or components. As one skilled in the art will appreciate, different persons may refer to the same feature or component by different names. This document does not intend to distinguish between components or features that differ in name but not function, unless specifically stated. In the discussion and in the claims, the terms "including" and "comprising" are used in an open-ended fashion, and thus should be interpreted to mean "including, but not limited to . . . ." Also, the term "couple" or "couples" is intended to mean either an indirect or direct connection. In addition, the terms "axial" and "axially" generally mean along or parallel to a central axis (e.g., central axis of a body or a port), while the terms "radial" and "radially" generally mean perpendicular to the central axis. The use of "top," "bottom," "above," "below," and variations of these terms is made for convenience, but does not require any particular orientation of the components.

Reference throughout this specification to "one embodiment," "an embodiment," or similar language means that a particular feature, structure, or characteristic described in connection with the embodiment may be included in at least one embodiment of the present disclosure. Thus, appearances of the phrases "in one embodiment," "in an embodiment," and similar language throughout this specification may, but do not necessarily, all refer to the same embodiment.

Although the present invention has been described with respect to specific details, it is not intended that such details should be regarded as limitations on the scope of the invention, except to the extent that they are included in the accompanying claims.

What is claimed is:
1. An acoustic logging tool, comprising:
a support structure configured to be disposed in a housing for use within a wellbore;
a first acoustic transducer and a second acoustic transducer coupled to the support structure,
wherein at least a portion of the first transducer is parallel with the second transducer, and the first acoustic transducer and the second acoustic transducer are coupled only at a first end to a first end-piece and at a second end to a second end-piece, wherein the first end-piece and the second end-piece are located at different longitudinal positions along the support structure;
wherein the first and second acoustic transducers are configured to propagate an acoustic signal in a propagation direction perpendicular to the support structure into a target formation region; and wherein the first acoustic transducer is configured to generate an acoustic output having a different frequency than the second acoustic transducer.

2. The acoustic logging tool of claim 1, wherein each of the first and second acoustic transducers comprises:
a substrate having a first side and a second side;
a first piezoelectric element coupled to first side; and
a second piezoelectric element coupled to second side.

3. The acoustic logging tool of claim 1, wherein the first acoustic transducer is located laterally next to the second acoustic transducer or located so as to overlap with the second acoustic transducer in the direction of propagation.

4. The acoustic logging tool of claim 1, wherein the first acoustic transducer and the second acoustic transducer are configured to exhibit different $1^{st}$ mode and $3^{rd}$ mode frequencies.

5. The acoustic logging tool of claim 1, wherein the first acoustic transducer comprises a flange length which is shorter than a flange length of the second transducer and is configured to exhibit a lower $1^{st}$ mode frequency than the second acoustic transducer.

6. The acoustic logging tool of claim 1, wherein the acoustic transducer assembly comprises a third acoustic transducer identical to the first acoustic transducer and wherein the first and third acoustic transducers are located on opposite sides of the second acoustic transducer.

7. The acoustic logging tool of claim 1, further comprising a plurality of sets of first and second acoustic transducers, each set configured to propagate an acoustic signal in a different direction.

8. The acoustic logging tool of claim 2, wherein:
the substrate extends beyond the first and second piezoelectric components of the first acoustic transducers by a first flange area;
the substrate extends beyond the first and second piezoelectric components of the second acoustic transducers by a second flange area; and
the first flange area is a different size than the second flange area.

9. A method of performing acoustic logging from an acoustic logging tool within a wellbore, comprising:
emitting a first acoustic wave from a first acoustic transducer, the first acoustic wave propagating in a first direction perpendicular to the acoustic logging tool at a first frequency into a target formation region; and
emitting a second acoustic wave from a second acoustic transducer, the first acoustic wave propagating in the first direction at a second frequency into the target formation region, wherein the second frequency is different from the first frequency;
wherein the first acoustic transducer and the second acoustic transducer are coupled only at a first end to a first end-piece and at a second end to a second end-piece, and the first end-piece and the second end-piece are located at different longitudinal positions along the support structure.

10. The method of claim 9, further comprising:
propagating the sum of the first acoustic wave and the second acoustic wave into the target formation region.

11. The method of claim 9, wherein the first acoustic transducer is disposed laterally next to the second acoustic transducer or overlaps the second acoustic transducer in the direction of propagation.

12. The method of claim 9, wherein the first acoustic transducer and the second acoustic transducer are co-located in an axial direction.

13. The method of claim 9, further comprising:
emitting the first acoustic wave at a $1^{st}$ mode frequency; and
emitting the second acoustic wave at a $3^{rd}$ mode frequency.

14. The method of claim 9, further comprising:
emitting a third acoustic wave from a third acoustic transducer, the third wave propagating in the first direction.

15. The method of claim 9, further comprising:
measuring a pressure generated by the first and second transducers at a specific distance.

16. The method of claim 9, further comprising:
generating a dipole acoustic signal from the first acoustic wave, the second acoustic wave, or both.

17. An acoustic transducer assembly configured to be disposed within a support structure for use within a wellbore, comprising:
a first acoustic transducer and a second acoustic transducer, each of the first and second acoustic transducers comprising:
a substrate comprising a first end, a second end, a first side, and a second side;
a first piezoelectric element coupled to the first side; and
a second piezoelectric element coupled to the second side;
wherein the first ends of the first and second transducers are fixed together at a first end-piece and the second ends of the first and second acoustic transducers are fixed together at a second end-piece and the first end-piece and the second end-piece are located at different longitudinal positions along the support structure;
wherein the first and second acoustic transducers are configured to generate acoustic signals that propagate in a propagation direction perpendicular to the support structure into a target formation region downhole within the wellbore; and
wherein the first acoustic transducer is configured to generate an acoustic output having a different frequency than the second acoustic transducer.

18. The acoustic logging tool of claim 17, wherein the first acoustic transducer is located laterally next to the second acoustic transducer or located so as to overlap with the second acoustic transducer in the direction of propagation.

19. The acoustic logging tool of claim 17, wherein the first acoustic transducer and the second acoustic transducer are co-located in an axial direction.

20. The acoustic logging tool of claim 17, wherein the first acoustic transducer and the second acoustic transducer are configured to exhibit different $1^{st}$ mode and $3^{rd}$ mode frequencies.

21. The acoustic logging tool of claim 17, the first and second acoustic transducers are free to vibrate independently from each other.

22. The acoustic logging tool of claim 17, wherein:
the substrate of the first acoustic transducer extends beyond the first and second piezoelectric components of the first acoustic transducer by a first flange area;
the substrate of the second acoustic transducer extends beyond the first and second piezoelectric components of the second acoustic transducer by a second flange area; and
the first flange area is a different size than the second flange area.

23. The acoustic logging tool of claim 17, wherein the first acoustic transducer and the second acoustic transducer have different natural frequencies.

\* \* \* \* \*